United States Patent [19]
Kojima et al.

[11] Patent Number: 5,518,456
[45] Date of Patent: May 21, 1996

[54] BICYCLE DERAILLEUR

[75] Inventors: Satoru Kojima; Yoshiaki Ando, both of Sakia, Japan

[73] Assignee: Shimano, Inc., Osaka, Japan

[21] Appl. No.: 346,417

[22] Filed: Nov. 29, 1994

[30] Foreign Application Priority Data

Nov. 30, 1993 [JP] Japan .................................. 5-299767

[51] Int. Cl.⁶ .................................................. F16H 59/04
[52] U.S. Cl. ............................................. 474/77; 474/82
[58] Field of Search .................................. 474/82, 58, 27, 474/28, 80

[56] References Cited

U.S. PATENT DOCUMENTS

| | | | |
|---|---|---|---|
| 4,002,080 | 1/1977 | Huret et al. | 474/82 |
| 4,406,643 | 9/1983 | Shimano | 474/82 |
| 4,416,646 | 11/1983 | Bergles | 474/80 |
| 4,507,101 | 3/1985 | Nagano | 474/82 |
| 4,530,677 | 7/1985 | Nagano | 474/82 X |
| 4,573,951 | 3/1986 | Nagano | 474/82 |
| 4,575,365 | 3/1986 | Nagano | 474/82 X |
| 4,619,633 | 10/1986 | Nagano | 474/82 |
| 4,637,809 | 1/1987 | Nagano | 474/82 X |
| 4,642,072 | 2/1987 | Nagano | 474/82 |
| 4,692,131 | 9/1987 | Nagano | 474/82 X |
| 4,755,162 | 7/1988 | Nagano | 474/82 |
| 5,037,355 | 8/1991 | Kobayashi | 474/82 |
| 5,302,155 | 4/1994 | Ishibashi | 474/82 |

*Primary Examiner*—Roger J. Schoeppel
*Attorney, Agent, or Firm*—James A. Deland

[57] ABSTRACT

A bicycle derailleur operable by a control cable to shift a chain between a large gear and a small gear, includes a parallelogram link mechanism having a base member connectable to a bicycle frame, a support member, and a pair of pivotal links extending between the support member and the base member, and a return spring for biasing the support member in one direction. A shift control member connectable to the control cable is supported by the parallelogram link mechanism to be displaceable relative thereto between a first position for contacting the parallelogram link mechanism and a second position separated therefrom. The return spring is a tension coil type spring connected at one end thereof to the shift control member and at the other end to the parallelogram link mechanism. The return spring biases the support member in one direction through the shift control member. The shift control member is operable, by an operating force applied through the control cable, to displace the support member through the return spring in a direction opposite to the direction in which the support member is biased by the return spring.

9 Claims, 5 Drawing Sheets

BICYCLE DERAILLEUR

BACKGROUND OF THE INVENTION

1. Field of the Invention

The present invention relates to a bicycle derailleur including a parallelogram link mechanism having a base member connected to a bicycle frame, a support member for supporting a chain shifting member, and a pair of pivotal links extending between the support member and base member. The support member is movable relative to the base member in one direction between a smaller gear and a larger gear under a pulling force of a control cable, and in the other direction under a restoring force of a return spring.

2. Description of the Related Art

A conventional bicycle derailleur as noted above is disclosed in Japanese Patent Publication Kokai No. 61-12486, for example. This derailleur includes a control member pivotally connected to one of a pair of pivotal links, and a torsion spring mounted on a support axis supporting the control member. The torsion spring has one leg thereof engaged with the control member, and the other leg engaged through a pivotal member with the other pivotal link opposed to the pivotal link pivotally supporting the control member. When a control cable connected to the control member is pulled, its pulling force is transmitted to the pivotal links through the torsion spring. Then, the pivotal links pivot relative to the base member toward a larger gear, with the support member moving relative to the base member at the same time. As a result, a guide wheel moves relative to the base member to shift a chain to a larger one of a plurality of gears. Conversely, when the control cable is relaxed, the pivotal links pivot relative to the base member toward a smaller gear under the elastic restoring force of the torsion spring, with the support member moving relative to the base member at the same time. As a result, the guide wheel moves relative to the base member to shift the chain to a smaller one of the gears.

When a shifting operation is carried out to shift the chain to a larger gear staying still, a resistance stronger than usual is applied to the chain shifting. Consequently, when the torsion spring is elastically deformed by the pulling force of the control cable, only the control member pivots relative to the pivotal links, with the support member remaining still. Subsequently, when the gears begin rotating, the resistance to the chain shifting falls to a normal value. Only then, the pivotal member moves to a position opposed to the control member, which is due to an operating force of the torsion spring stored therein by its preceding elastic deformation. With the resultant movement of the support member, the guide wheel moves relative to the base member to shift the chain to a selected larger gear.

That is, the torsion spring acts as a return spring to effect an operation to shift the chain to a smaller gear. During an operation to shift the chain to a larger gear, depending on the degree of a resistance to the operation, the torsion spring acts as a saver spring to store the operating force.

In the prior construction noted above, however, the coiled portion of the spring may be rubbed when the spring exerts an operating force in a shifting operation. This results in a situation where an operating force corresponding to a resilience intrinsic to the spring itself is not applied to actual chain shifting. Further, earth or sand lodged in or adhering to the coiled portion is not easy to remove, which also tends to cause loss of resilience. As a countermeasure to such phenomena, a strong spring which can cover some loss of resilience is employed to achieve chain shifting as desired. This results in a relatively strong force required when effecting a shifting operation against the force of the spring.

SUMMARY OF THE INVENTION

The object of the present invention is to provide a bicycle derailleur which has functions of both a return spring and a saver spring without increasing the operating force, and which is readily adaptable to special gear designed to involve a resistance to chain shafting in positions other than a shift position greater than a resistance in the shift position.

The above object is fulfilled, according to the present invention, by a bicycle derailleur as noted in the outset hereof in which the parallelogram link mechanism includes, pivotably attached thereto, a shift control member having a coupling for connection to the control cable and a contact portion for contacting the parallelogram link mechanism, the return spring being a tension coil spring extending between the shift control member and parallelogram link mechanism to bias the shift control member in a direction to move the contact portion of the shift control member into contact with the parallelogram link mechanism.

According to the above construction, when the control cable is pulled, the tension spring is deformed to displace the parallelogram link mechanism while storing an elastic restoring force, to move the support member relative to the base member toward a smaller gear or a larger gear. The chain shifting member moves with the support member to shift the chain to one of the smaller gear and larger gear. When the control cable is relaxed, the elastic restoring force stored in the tension spring moves the shift control member to press its contact portion against the parallelogram link mechanism. Then, the support member moves relative to the base member toward the other of the smaller gear and larger gear. The chain shifting member moves with the support member to shift the chain to the other of the smaller gear and larger gear. Thus, the tension spring acts as a return spring when the control cable is relaxed, to effect a shifting operation in a direction opposite to the shifting direction by the pulling operation of the control cable.

The tension spring has a predetermined strength to act as a saver spring when a shifting operation is effected by pulling the control cable. That is, when a shift resistance exceeding a normal value is applied to the chain shifting member, the tension spring allows only the shift control member to pivot without displacing the parallelogram link mechanism. With this setting, when a shift resistance exceeding a predetermined value is applied to the chain shifting member in a shifting operation by pulling of the control cable, with the gears standing still, the pulling force of the control cable causes the shift control member to pivot alone, with the tension spring deformed to store an elastic restoring force. The parallelogram link mechanism is not displaced then, and the chain shifting member remains in the same position where it was before the shifting operation. When, subsequently, the shift resistance applied to the chain shifting member reduces to the normal value, e.g. with the gears beginning to rotate, the elastic restoring force stored in the tension spring displaces the parallelogram link mechanism until the latter contacts the contact portion of the shift control member having pivoted alone in advance. The resultant movement of the support member moves the chain shifting member from the position where it was before the shifting operation to a position determined by the contact between the shift control member and parallelogram link mechanism to shift the chain to a selected gear. That is, the tension spring acts as a saver spring for storing an operating force when a shifting operation is effected in a direction opposite to the direction of operation in which the tension spring acts as a return spring. Thus, the function of a saver spring is added to the return spring, or one spring acts both as a return spring and a saver spring. This allows a returning force to be set to a lower value than where two separate springs are employed.

Further, a tension spring has a less chance of its coiled portions rubbing each other than a torsion spring, and hence less likelihood of loss of its resilience. Any earth and sand adhering to or lodged in the tension spring may slip off through gaps formed between the coiled portions when the spring is stretched. Thus, the tension spring is less likely to malfunction due to earth and sand adhering to or remaining lodged therein than the torsion spring used in the prior art. With little chance of loss of the resilience, the return spring may output a reduced returning force to realize a desired return operation. This allows a shifting operation to be carried out relatively easily in the direction opposite to a shifting direction by the return spring. A relatively weak resilience provides a further advantage. That is, in the case of special gears having special shift positions to facilitate shifting of the chain, which are provided by forming part of a plurality of teeth into a special shape, an excessive force of the return spring would allow ordinary teeth having a relatively strong shift resistance to effect chain shifting inadvertently regardless of the shape of the teeth. The derailleur according to the present invention allows use of a relatively weak spring, the chain is not shifted in positions other a shift position, and an operating force is stored with high precision until a shift takes place in the shift position. Thus, a shift is effected only in the shift position. In other words, even ordinary teeth not providing a shift position have a relatively small shift resistance, a chain shift does not take place in such tooth positions, but the return spring acts as a saver spring to store the operating force with high precision.

Other features and advantages of the invention will be apparent from the following description of the preferred embodiments to be taken in conjunction with the accompanying drawings.

DETAILED DESCRIPTION OF THE PREFERRED EMBODIMENTS

Figure 1:
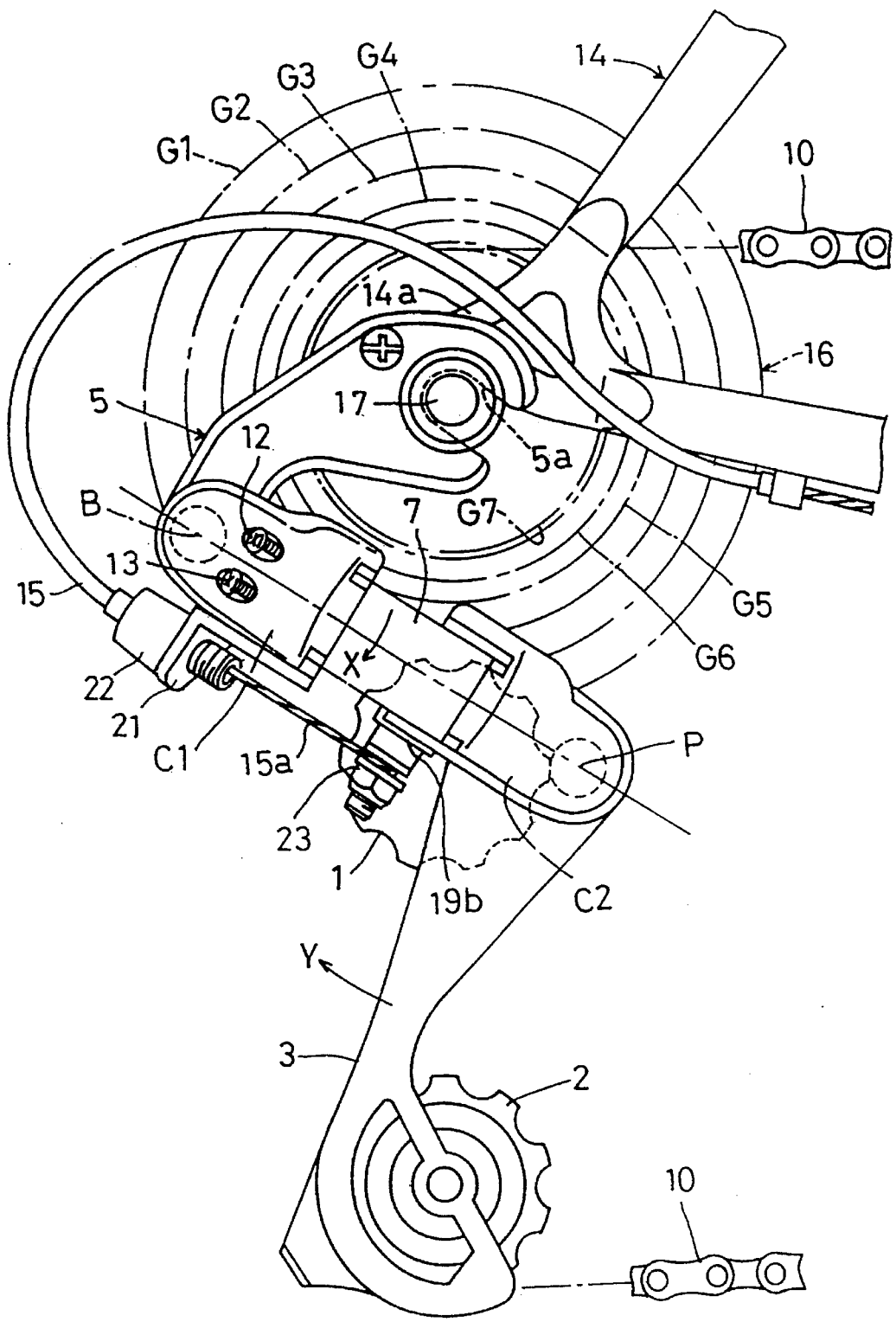
FIG. 1 is an overall side view of a rear derailleur for a bicycle according to the present invention.
Figure 2:
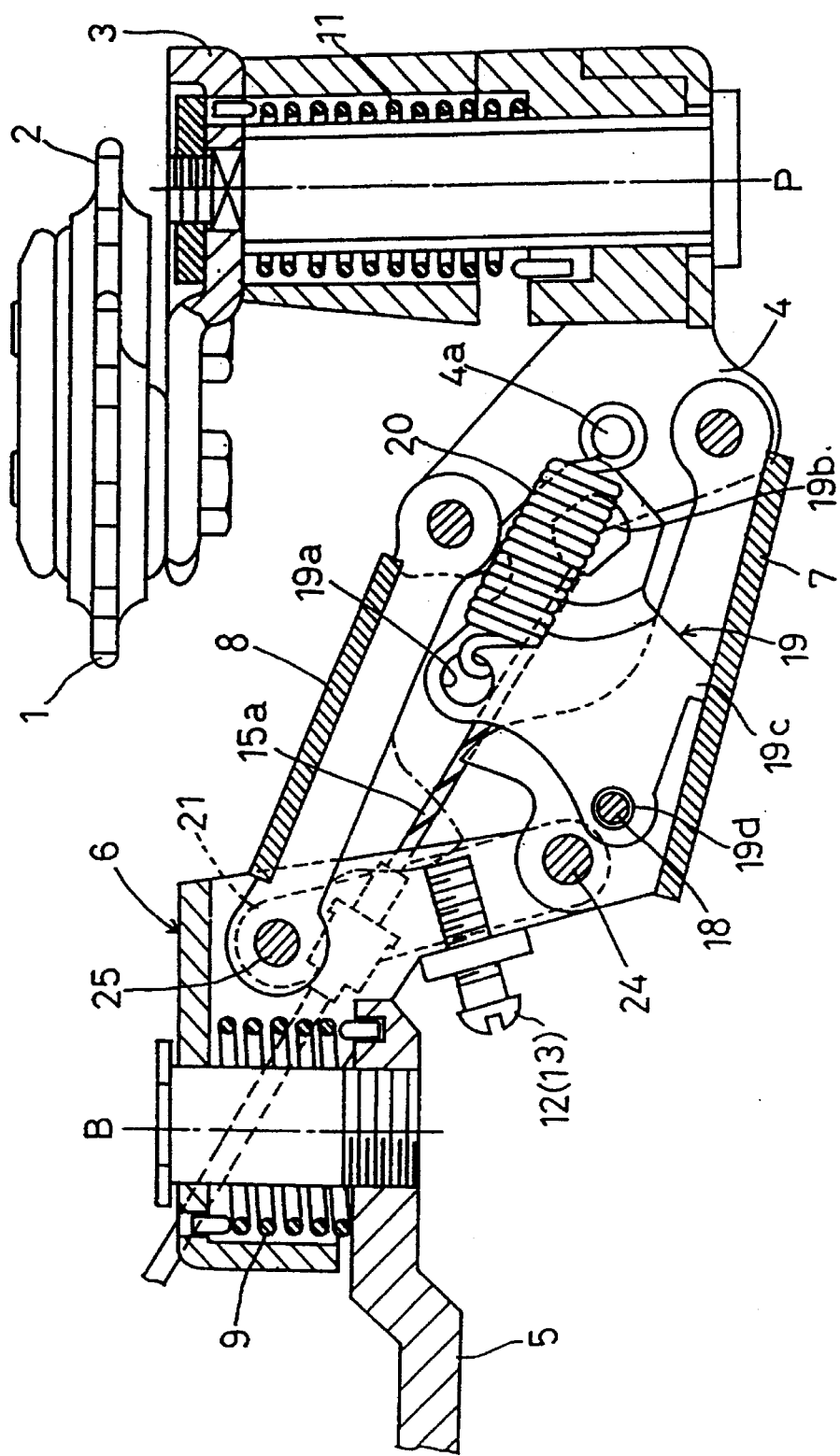
FIG. 2 is a sectional view of a parallelogram link mechanism.

FIGS. 1 and 2 show the construction of a rear derailleur according to the present invention. This derailleur includes a guide plate 3 having a guide wheel 1 and a tension wheel 2 and connected to a support member 4 to be pivotable about an axis P. The support member 4 is connected through a pair of pivotal links 7 and 8 to a base member 6. The base member 6 in turn is connected, to be relatively pivotable about an axis B, to a mounting bracket 5 extending from a bicycle frame 14. A first tension spring 10 is mounted between the bracket 5 and base member 6 to bias the base member 6 to pivot in X direction shown in FIG. 1, relative to the mounting bracket 5. Consequently, the support member 4 is biased in X direction about the axis B, to tighten a chain 10 through the guide wheel 1 and tension wheel 2. A second tension spring 11 is mounted between the support member 4 and guide plate 3 to bias the guide plate 3 to pivot in Y direction shown in FIG. 1, about the axis P relative to the support member 4. Consequently, the guide wheel 1 and tension wheel 2 are biased in Y direction about the axis P to tighten the chain 10. The base member 6 has a pair of adjusting screws 12 and 13, and a removable first cap C1 for covering the adjusting screws 12 and 13. The support member 4 has a second cap C2 for covering an outer end portion of the support member 4.

The rear derailleur having the above construction is attached to the bicycle frame 14 through the mounting bracket 5 as shown in FIG. 1. This derailleur is operable by a control cable 15 extending from a shift lever device (not shown), to change the chain 10 among seven gears G1–G7 of a mar multistage wheel assembly 16. Specifically, the mounting bracket 5 has a cutout mounting bore 5a formed in an end thereof remote from the base member 6. This mounting bore 5a is shaped to receive a rear wheel hub spindle 17. That is, the end of the mounting bracket 5 is tightened along with the hub spindle 14 to a rear fork end 14a of the bicycle frame 14, thereby to be connected to the bicycle frame 14. Through this connection, the rear derailleur is attached to the bicycle frame 14.

As shown in FIG. 2, the base member 6, support member 4, and pivotal links 7 and 8 constitute a parallelogram link mechanism. The outer pivotal link 7 has a shift control member 19 attached thereto through a pivotal axis 18. A return spring 20 comprising a tension coil spring extends between a spring engaging bore 19a of the control member 19 and a spring engaging pin 4a of the support member 4. The base member 6 has an outer tube holder 22 attached thereto through a holder support 21. The shift control member 19 includes an inner wire coupling 19b having a wire coupling screw 23, and a contact portion 19c for contacting an inward surface of the pivotal link 7, to be operable by the control cable 15.

Specifically, the control cable 15 has an outer tube connected at an end thereof to the outer tube holder 22 to be supported by the base member 6, and an inner wire 15a clamped by the wire coupling screw 23 to be connected to the wire coupling 19b of the control member 19. When the inner wire 15a is pulled or relaxed, the guide wheel 1 moves transversely of the bicycle under the pulling force or an operating force of the return spring 20, to shift the chain 10 to a selected one of the mar gears G1–G7.

An operation of the above derailleur will be described, exemplifying a shifting operation between a seventh speed state in which the chain 10 is engaged with the smallest, seventh speed gear G7, and a sixth speed state in which the chain 10 is engaged with the next smallest, sixth speed gear G6.

Figure 3:
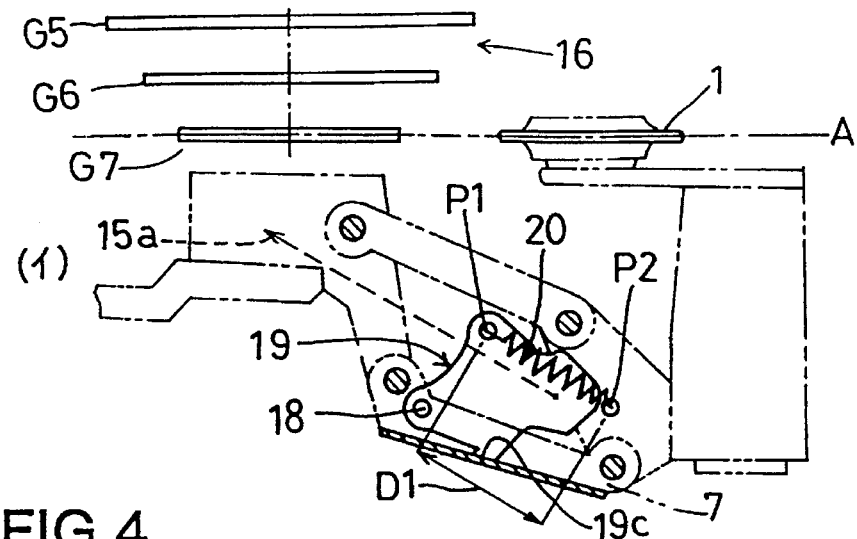
FIGS. 3 through 5 are explanatory views showing a series of operative states of a return spring according to the present invention.

In FIG. 3, the guide wheel 1 is in a seventh speed position A with the chain 10 engaged with the seventh speed gear G7. The contact portion 19c of the shift control member 19, under the pulling force of the return spring 20, is in contact with the pivotal link 7. When the inner wire 15a is pulled in a normal shift resistance condition with the rear multistage wheel assembly 16 in rotation, for example, the return spring 20 applies its pulling force to the spring engaging pin 4a of the support member 4 to pull the support member 4. As a result, the pivotal link 7 remaining in contact with the contact portion 19c of the shift control member 19 pivots with the control member 19. This pivotal movement stops when its pivoting stroke coincides with an operating stroke of the inner wire 15a. That is, the pulling operation applied through the inner wire 15a moves the shift control member 19 from the shift position shown in FIG. 3 to the shift position shown in FIG. 5. Simultaneously, the pivotal link formed of the base member 6, support member 4 and pivotal links 7 and 8 is displaced, under the pulling force of the return spring 20, from the state shown in FIG. 3 to the state shown in FIG. 5. As a result, the support member 4 moves relative to the base member 6 toward a larger gear of the rear multistage wheel assembly 16, to move the guide wheel 1 from the seventh speed position A to a sixth speed position B. With a relative pivotal movement occurring at this time between the support member 4 and pivotal link 7, a distance between a spring connecting point P1 of the shift control member 19 and a spring connecting point P2 of the support member 4 increases from D1 in FIG. 3 to D3 in FIG. 5. Consequently, the return spring 20 is elastically stretched to store a returning force while transmitting the operating force of the inner wire 15a to the support member 4 without delay.

Figure 4:
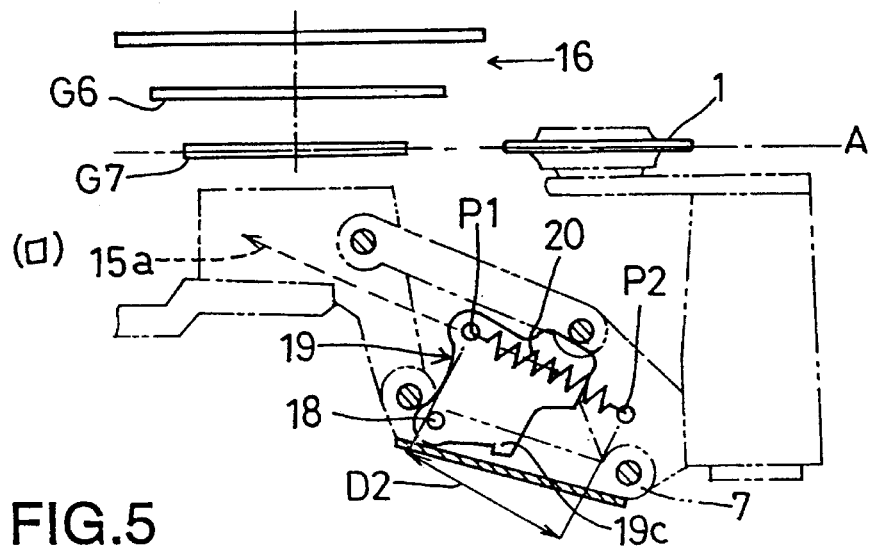

The inner wire 15a may be pulled under a condition where a relatively strong resistance is applied to the guide wheel 1, e.g. with the rear multistage wheel assembly 16 staying still, or the chain 10 being pressed in a non-shift position involving a greater chain shift resistance than the shift position for the seventh gear G7 even with the rear multistage wheel assembly 16 in rotation. Then, as shown in FIG. 4, only the shift control member 19 pivots about the pivotal axis 18 under the operating force of the inner wire 15a. The pivotal link 7 does not pivot relative to the base member 6, and the parallelogram link mechanism formed of the base member 6, support member 4 and pivotal links 7 and 8 is not displaced. Thus, the guide wheel 1 remains in the seventh speed position A. Meanwhile, with a relative pivotal movement between the support member 4 and pivotal link 7, the distance between the spring connecting point P1 of the shift control member 19 and the spring connecting point P2 of the support member 4 increases from D1 in FIG. 3 to D2 in FIG. 4, to stretch the return spring 20. That is, the return spring 20 acts as a saver spring to store the operating force of the inner wire 15a. Subsequently, the operating force stored in the return spring 20 causes the pivotal link 7 to pivot relative to the base member 6 when the shift resistance applied to the guide wheel 1 reduces to the normal value, e.g. with the rear multistage wheel assembly 16 beginning to rotate, or with the chain 10 pressed in the shifting position for the seventh gear G7. Then, the parallelogram link mechanism is displaced from the state shown in FIG. 4 to the state shown in FIG. 5, to place the pivotal link 7 in contact with the shift control member 19. Consequently, the support member 4 moves relative to the base member 6 toward a larger gear to move the guide wheel 1 from the shift position A to the shift position B.

Figure 5:
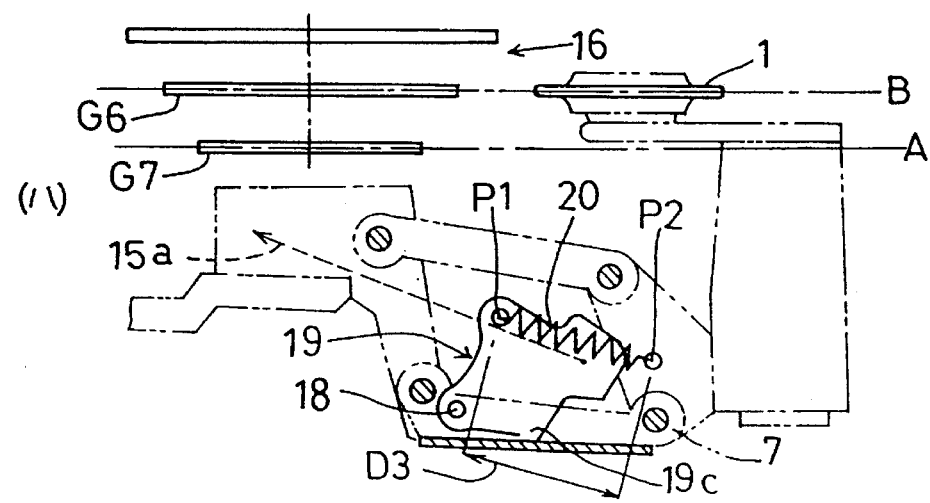

When the guide wheel 1 lies in the sixth speed position B with the chain 10 engaged with the sixth gear G6 as shown in FIG. 5, the contact portion 19c of the shift control member 19, under the pulling force of the return spring 20, contacts the pivotal link 7. When the inner wire 15a is relaxed in this state, the returning force stored in the return spring 20 causes the pivotal link 7 to pivot with the shift control member 19 while remaining in contact with the contact portion 19c of the control member 19. This movement stops when the relaxation of the inner wire 15a is canceled to support the shift control member 19 in a pulled state. That is, the returning force based on the restoring force of the return spring 20 switches the shift control member 19 from the shift position in FIG. 5 to the shift position in FIG. 3, with the parallelogram link mechanism displaced from the state in FIG. 5 to the state in FIG. 3. As a result, the support member 4 moves relative to the base member 6 toward a smaller gear to move the guide wheel 1 from the sixth speed position B to the seventh speed position A.

The holder support 21 is attached to pivotal axes 24 and 25 pivotally connecting the pair of pivotal links 7 and 8 to the base member 6. Thus, the pivotal axes 24 and 25 act also as connecting axes to connect the holder support 21 to the base member 6.

Figure 6:
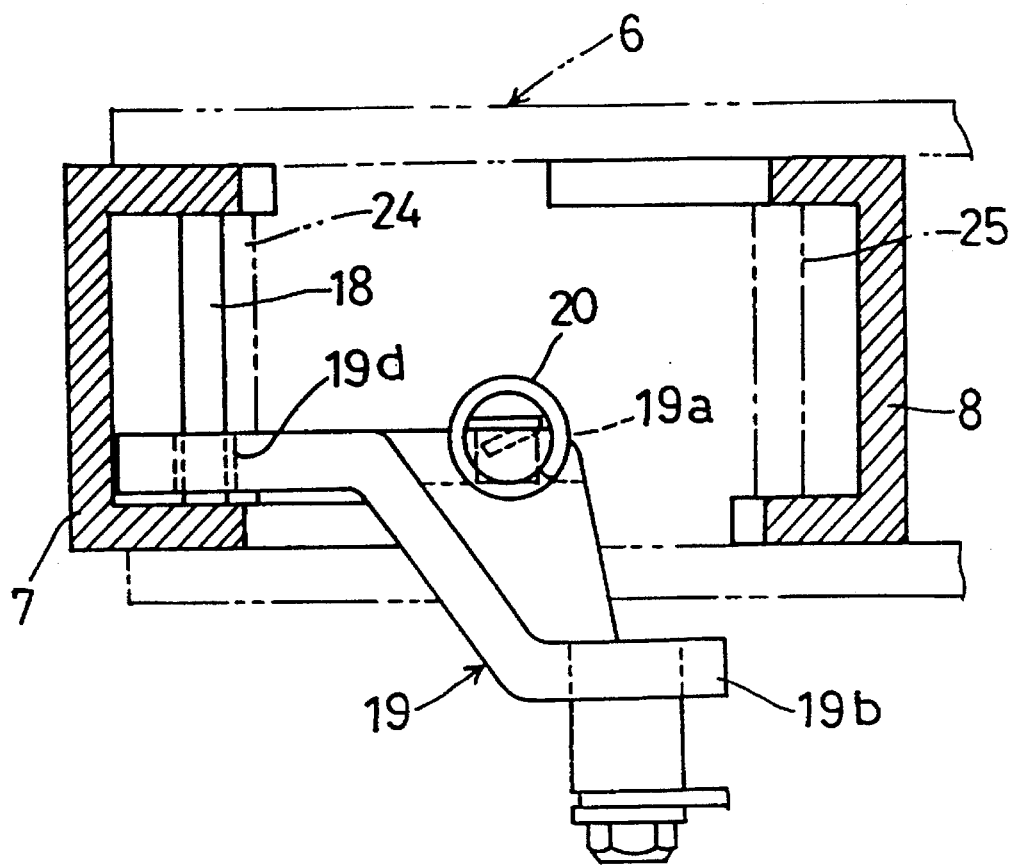
FIG. 6 is a sectional view of a structure for accommodating the return spring.

The shift control member 19 is formed as shown in FIGS. 2 and 6. The control member 19 defines, besides the spring engaging bore 19a, a bore 19d to be attached to the pivotal link 7 through the pivotal axis 18. This control member 19 includes a portion thereof defining the inner wire coupling 19b and vertically overlapping the rest of the control member 19. That is, the control member 19 has the inner wire coupling 19b and return spring 20 are assembled thereto one over the other. Consequently, the return spring 20 is laterally surrounded by the pivotal links 7 and 8 to be less exposed to earth and sand.

One of the adjusting screws 12 and 13 contacts the inner pivotal link 8 to set a limit to the pivotal movement of the pivotal link 8, thereby setting an inward stroke end of the guide wheel 1. The other of the adjusting screws 12 and 13 contacts the outer pivotal link 7 to set a limit to the pivotal movement of the pivotal link 7, thereby setting an outward stroke end of the guide wheel 1. That is, the adjustment of the limits to the pivotal movement of the pivotal links 7 and 8 made by turning the adjusting screws 21 and 22 adjusts a stroke of transverse movement of the support member 4 relative to the base member 6, a stroke end of movement of the support member 4 toward a large gear, and a stroke end of movement of the support member 4 toward a smaller gear. This adjustment assures that the guide wheel 1 moves to a predetermined position in time of a shifting operation, thereby to shift the chain 10 to any one of the gears G1–G7 properly.

Figure 7:
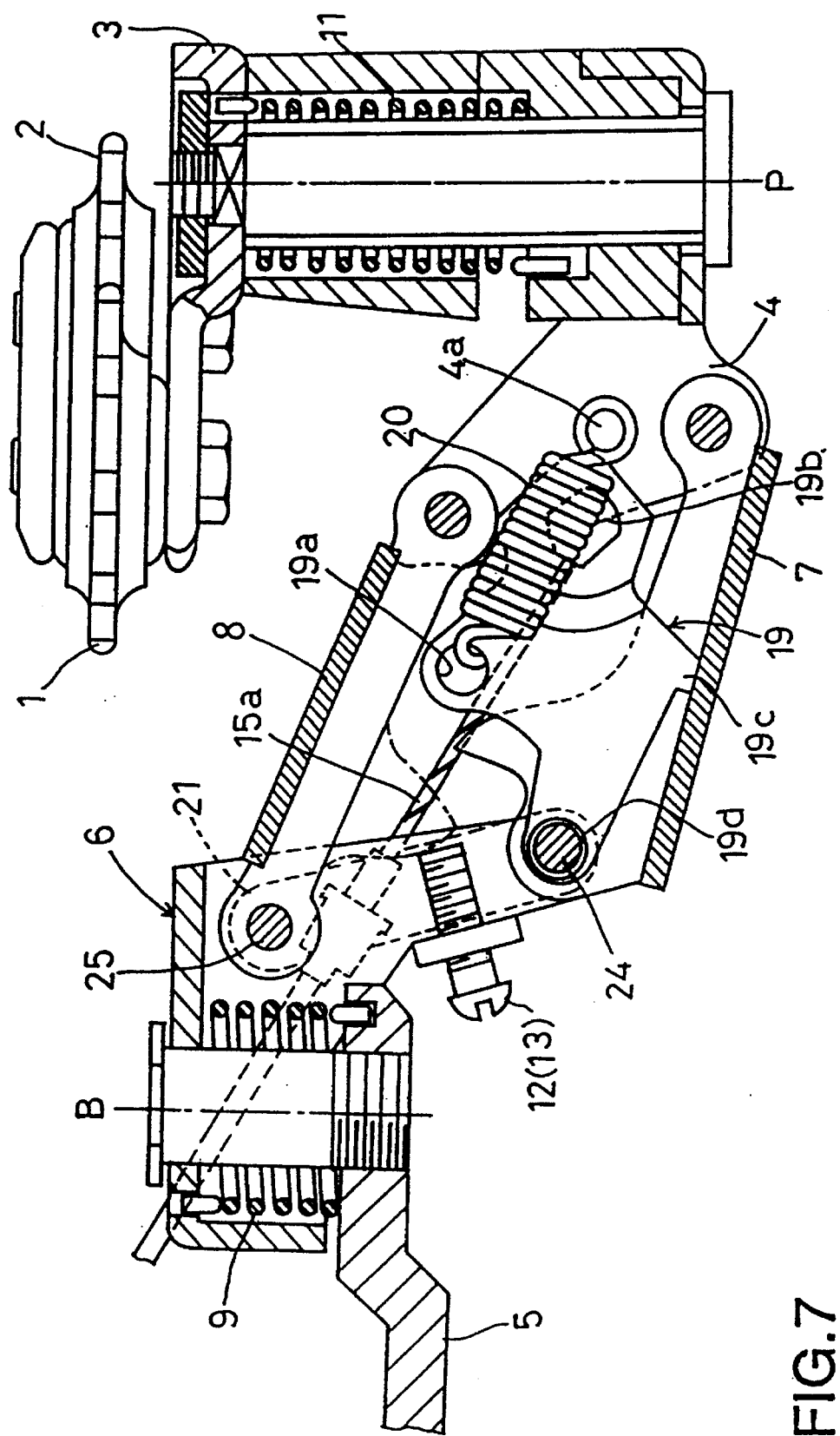
FIG. 7 is a sectional view of a parallelogram link mechanism of a rear derailleur in a different embodiment of the present invention.

In the above embodiment, the pivotal axis 18 interconnecting the shift control member 19 and pivotal link 7 is disposed in a position on the pivotal link 7 different from the location of the pivotal axis 24 for connection to the base member 6. That is, the shift control member 19 is connected to a position of the pivotal link 7 different from a position thereof to which the base member 6 is connected. This construction may be modified as shown in FIG. 7. In the modified construction, the shift control member 19 is attached to the pivotal axis 24 interconnecting the pivotal link 7 and base member 6. Thus, the shift control member 19 is connected to the pivotal link 7 through the pivotal axis 24. Consequently, the shift control member 19 and base member 6 are connected to the pivotal link 7 through a common pivotal axis.

The shift control member may be pivotally connected to the pivotal link opposed to the smallest gear.

Further, the shift control member may be pivotally connected to the base member.

In sum, the shift control member may be connected to any one of the base member, support member and pivotal links constituting the parallelogram link mechanism, with the return spring acting to return the support member toward a larger gear or a smaller gear, and acting as a saver spring in time of an operation opposite to the return operation. Thus, the shift control member 19 is attached to the parallelogram link mechanism to be pivotable independently. The contact portion 19c is called herein a contact portion for contacting the parallelogram link mechanism.

The present invention is applicable also to a front derailleur. Thus, the guide wheel 1 is called a chain shifting member 1.

What is claimed is:

1. A bicycle derailleur operable by a control cable to shift a chain between a large gear and a small gear, comprising:
    a parallelogram link mechanism including:
        a base member connectable to a bicycle frame,
        a support member, and
        a pair of pivotal links extending between said support member and said base member,
    a chain shifting member fixed to said support member to be displaceable through a displacement of said parallelogram link mechanism;
    a shift control member connectable to said control cable, said shift control member being rotatably supported by said parallelogram link mechanism, said shift control member having a contact portion for contacting one of said pair of pivotal links, said shift control member being rotatable between a first position where said contact portion is in contact with said one of said pair of pivotal links and a second position where said contact portion is away from said one of said pair of pivotal links;
    a tension coil type return spring connected at one end thereof to a first engaging portion of said shift control member and at the other end to a second engaging portion of said support member, said return spring biasing said support member in one direction along a lateral direction with respect to said bicycle when said shift control member is in said first position, a distance between said first engaging portion and said second engaging portion when said shift control member is in said second position is greater than said distance between said first engaging portion and said second engaging portion when said shift control member is in said first position whereby said return spring is stretched along an axial direction thereof to bias said support member in an opposite direction to said one direction when said shift control member is in said second position.

2. A bicycle derailleur as defined in claim 1, wherein said shift control member is supported by said parallelogram link mechanism to be pivotable relative thereto.

3. A bicycle derailleur as defined in claim 2, wherein said shift control member is pivotable in a plane extending substantially along said displacement of said parallelogram link mechanism.

4. A bicycle derailleur as defined in claim 2, wherein said shift control member is supported by one of said pivotal links to be pivotable relative thereto, and includes a contact portion for contacting said one of said pivotal links, said other end of said return spring being connected to said support member.

5. A bicycle derailleur as defined in claim 2, wherein said shift control member is supported by an outer one of said pivotal links, said return spring biasing said support member toward said small gear.

6. A bicycle derailleur as defined in claim 2, wherein said shift control member is pivotable about an axis through which one of said pivotal links is pivotally connected to said base member.

7. A bicycle derailleur as defined in claim 1, wherein said return spring is supported by said shift control member to be substantially contained in a space defined by said pair of pivotal links.

8. A bicycle derailleur as defined in claim 1, wherein said shift control member includes an upper plate portion and a lower plate portion vertically spaced from each other, said return spring being connected to said upper plate portion, said connection being formed on said lower plate portion.

9. A bicycle derailleur as defined in claim 1, wherein said operation of said control cable, in presence of a resistance exceeding a predetermined amount applied to said displacement of said parallelogram link mechanism, displaces only said shift control member relative to said parallelogram link mechanism without substantially displacing said parallelogram link mechanism.

* * * * *